US009240065B2

United States Patent
Yoshimura et al.

(10) Patent No.: US 9,240,065 B2
(45) Date of Patent: Jan. 19, 2016

(54) IMAGE PROCESSING APPARATUS AND IMAGE PROCESSING METHOD

(71) Applicant: Sony Corporation, Tokyo (JP)

(72) Inventors: Shinichi Yoshimura, Tokyo (JP); Masanori Kasai, Kanagawa (JP); Daisuke Kawazoe, Kanagawa (JP); Shin Yoshimura, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/373,995

(22) PCT Filed: Nov. 15, 2012

(86) PCT No.: PCT/JP2012/079622
§ 371 (c)(1),
(2) Date: Jul. 23, 2014

(87) PCT Pub. No.: WO2013/118364
PCT Pub. Date: Aug. 15, 2013

(65) Prior Publication Data
US 2014/0341483 A1 Nov. 20, 2014

(30) Foreign Application Priority Data

Feb. 9, 2012 (JP) .................................. 2012-025904

(51) Int. Cl.
G06K 9/36 (2006.01)
G06T 11/60 (2006.01)
G06T 5/00 (2006.01)
G06T 5/50 (2006.01)
H04N 5/232 (2006.01)
G06T 3/40 (2006.01)

(52) U.S. Cl.
CPC . *G06T 11/60* (2013.01); *G06T 3/40* (2013.01); *G06T 5/002* (2013.01); *G06T 5/50* (2013.01); *H04N 5/23232* (2013.01); *G06T 2207/20016* (2013.01); *G06T 2207/20221* (2013.01)

(58) Field of Classification Search
USPC ......... 382/284, 300, 299, 128, 132, 180, 275; 345/589; 348/66, 458, 441, 564, 576, 348/E5.076
See application file for complete search history.

(56) References Cited

U.S. PATENT DOCUMENTS 7,460,178 B2 * 12/2008 Kondo et al. ................. 348/576
8,687,859 B2 * 4/2014 Yan et al. ...................... 382/128
9,020,228 B2 * 4/2015 Yan et al. ...................... 382/128
2007/0296850 A1 12/2007 Yamazaki et al.

FOREIGN PATENT DOCUMENTS

JP 2006-310999 11/2006
JP 2007-243917 9/2007

* cited by examiner

Primary Examiner — Anh Do
(74) Attorney, Agent, or Firm — Hazuki International, LLC

(57) ABSTRACT

There is provided an image processing apparatus including an image processing unit which performs image processing on each of a plurality of images of a same subject having different resolutions, and an image combining unit which combines an image processing result of each of the plurality of images obtained by the image processing unit.

15 Claims, 13 Drawing Sheets

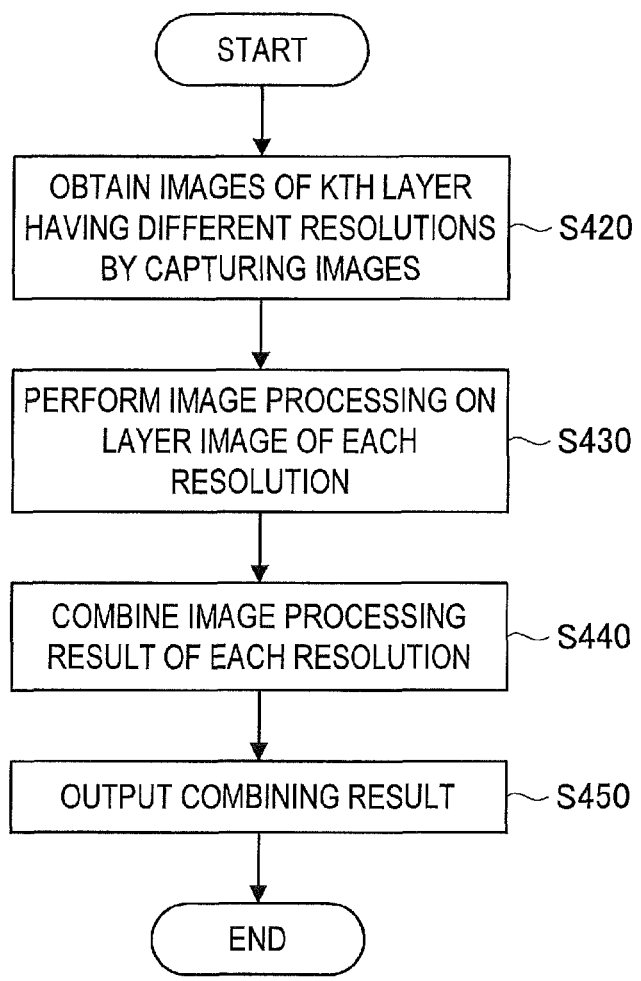

IMAGE PROCESSING APPARATUS AND IMAGE PROCESSING METHOD

CROSS REFERENCES TO RELATED APPLICATIONS

The present invention is the National Stage of International Application No. PCT/JP2012/079622, filed in the Japanese Patent Office as a Receiving Office on Nov. 15, 2012, and claims the priority benefit of Japanese Patent Application Number 2012-025904, filed in the Japanese Patent Office on Feb. 9, 2012, which is hereby incorporated by reference to the maximum extent allowable by law.

TECHNICAL FIELD

The present disclosure relates to an image processing apparatus and an image processing method.

BACKGROUND ART

In recent days, as an image sensor has a greater number of pixels, the number of pixels of a captured image obtained by an imaging apparatus increases, and a pixel size tends to be small. While details of a subject can be represented as a result of an increase in the number of pixels, noise increases when the pixel size is small and image quality deterioration becomes distinct. This image quality deterioration can be more effectively corrected by noise cancellation by a spatial filter. However, when the number of pixels of an image increases, the number of pixels to be processed by a spatial filter also increases, and therefore a hardware scale and cost for realizing the spatial filter increase.

From this point of view, it may be appropriate to reduce the number of pixels of an original image to generate a reduced image and perform image processing on the reduced image (see, for example, Patent Literature 1). Consequently, it is possible to prevent a hardware scale from increasing, and a processing time from being longer.

CITATION LIST

Patent Literature

Patent Literature 1: U.S. Pat. No. 7,889,949A

SUMMARY OF INVENTION

Technical Problem

However, it is difficult to obtain a high-definition processing result image only by performing image processing on a reduced image whose high frequency component of an original image is lost.

It is therefore an object of the present disclosure to provide a new and improved image processing apparatus and image processing method which can obtain a high-definition image while suppressing a processing load.

Solution to Problem

According to the present disclosure, there is provided an image processing apparatus including an image processing unit which performs image processing on each of a plurality of images of a same subject having different resolutions, and an image combining unit which combines an image processing result of each of the plurality of images obtained by the image processing unit.

According to the present disclosure, there is provided an image processing method including performing image processing on each of a plurality of images of a same subject having different resolutions, and combining an image processing result of each of the plurality of images.

Advantageous Effects of Invention

As described above, according to the present disclosure, a high-definition image can be obtained while a processing load can be suppressed.

BRIEF DESCRIPTION OF DRAWINGS

FIG. 13 is a flowchart illustrating an operation of the image processing apparatus according to the second embodiment.

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and repeated explanation is omitted.

Further, a plurality of components that has substantially the same function and structure is distinguished by allocating different alphabets to the same reference signs in the description and the drawings in some cases. However, only the same reference signs will be allocated to the components particularly when it is not necessary to distinguish between a plurality of components that has substantially the same function and structure.

Further, the present disclosure will be described in order of the following items.

1. Outline of Image Processing Apparatus
2. First Embodiment
2-1. Configuration of Image Processing Apparatus according to First Embodiment
2-2. Operation of Image Processing Apparatus according to First Embodiment
3. Second Embodiment
4. Conclusion

1. OUTLINE OF IMAGE PROCESSING APPARATUS

A technique according to the present disclosure can be implemented in various modes as described in detail in "2. First Embodiment" to "3. Second Embodiment" as examples. Further, an image processing apparatus 10 according to each embodiment has:
A. image processing units (212, 222, . . . 232) which perform image processing on each of a plurality of images of a single subject having different resolutions; and
B. image combining units (214, 224) which combine image processing results of each of a plurality of images obtained by the image processing units.

First, a basic configuration of the image processing apparatus 10 which is common in each embodiment will be described below with reference to FIG. 1.

Figure 1:
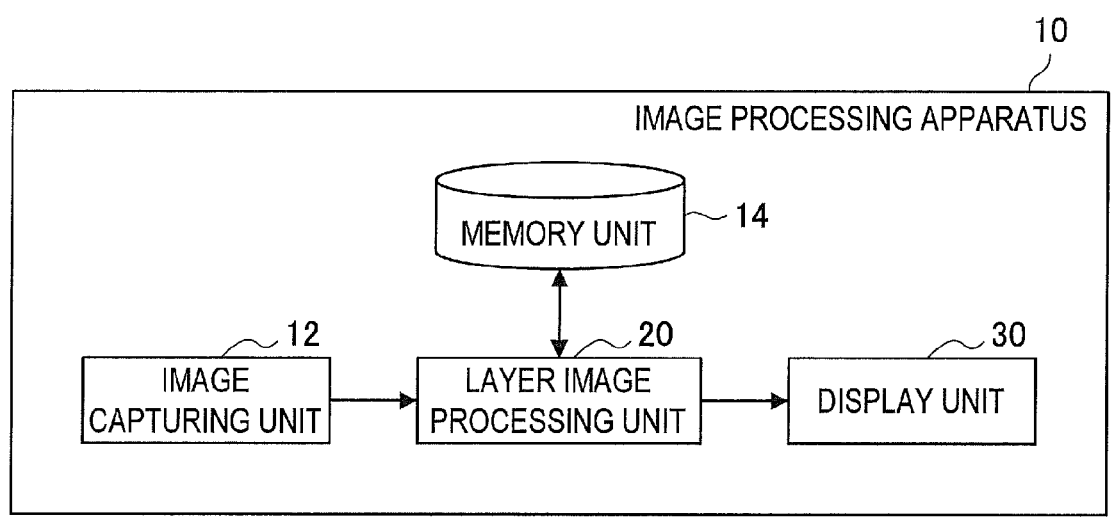
FIG. 1 is an explanatory view illustrating a configuration of an image processing apparatus according to an embodiment of the present disclosure.

FIG. 1 is an explanatory view illustrating a configuration of the image processing apparatus 10 according to the embodiments of the present disclosure. As illustrated in FIG. 1, the image processing apparatus 10 according to the embodiments of the present disclosure has an image capturing unit 12, a memory unit 14, a layer image processing unit 20 and a display unit 30.

The image capturing unit 12 converts light emitted from a subject into an electric image signal. More specifically, the image capturing unit 12 includes an image capturing optical system such as a capturing lens or a zoom lens which condenses light, an image capturing element such as a CCD (Charge Coupled Device) or a CMOS (Complementary Metal Oxide Semiconductor) and a shutter (a physical shutter or an electronic shutter) which controls exposure. Upon exposure performed by the shutter, the image capturing optical system forms a subject image on the image capturing element by condensing light emitted from a subject, and the image capturing element converts the formed subject image into an electric image signal.

The memory unit 14 stores a program for causing the image processing apparatus 10 to operate, and images obtained by the image capturing unit 12 or images obtained by the layer image processing unit 20.

This memory unit 14 may be a memory medium such as a non-volatile memory, a magnetic disk, an optical disc, or a MO (Magneto Optical) disc. The non-volatile memory is, for example, a flash memory, an SD card, a micro SD card, a USB memory, an EEPROM (Electrically Erasable Programmable Read-Only Memory) or an EPROM (Erasable Programmable ROM). Further, the magnetic disk is, for example, a hard disk or a disk magnetic disk. Furthermore, the optical disc is, for example, a CD (Compact Disc), a DVD (Digital Versatile Disc) and a BD (Blu-Ray Disc (registered trademark)).

The layer image processing unit 20 performs image processing on an image inputted from the image capturing unit 12 or the memory unit 14. Although described in detail below, the layer image processing unit 20 performs image processing on each of a plurality of images of a single subject having different resolutions, and combines an image processing result of each of a plurality of images. According to this configuration, it is possible to suppress a hardware scale and cost compared to a case where image processing is performed only on images having high resolutions, and provide high-definition images compared to a case where image processing is performed only on images having low resolutions.

The display unit 30 displays, for example, an image obtained by image processing performed by the layer image processing unit 20. This display unit 30 may be a liquid crystal display (LCD) device or an OLED (Organic Light Emitting Diode) device.

Note that, although an example where the image processing apparatus 10 has the image capturing unit 12 as an image capturing function has been described above, the image processing apparatus 10 may not have an image capturing function. Further, the image processing apparatus 10 may be an information processing apparatus such as a PC (Personal Computer), a home video image processing apparatus (e.g. a DVD recorder or a video cartridge recorder), a PDA (Personal Digital Assistants), a home game apparatus or a home electronic appliance. Furthermore, the image processing apparatus 10 may be a mobile information processing apparatus such as an imaging apparatus, a smartphone, a mobile telephone, a PHS (Personal Handyphone System), a mobile music playback apparatus, a mobile video image processing apparatus, and a mobile game apparatus.

(Background)

Hereinafter, a background of the embodiments of the present disclosure will be described. In recent days, as an image sensor (image capturing element) has a greater number of pixels, the number of pixels of a captured image obtained by an imaging apparatus increases, and a pixel size tends to be small. While details of a subject can be represented as a result of an increase in the number of pixels, noise increases when the pixel size is small and image quality deterioration becomes distinct. This image quality deterioration can be more effectively corrected by noise cancellation by a spatial filter. However, when the number of pixels of an image increases, the number of pixels to be processed by a spatial filter also increases, and therefore a hardware scale and cost for realizing the spatial filter increase.

From this point of view, it may be appropriate to reduce the number of pixels of an original image to generate a reduced image and perform image processing on the reduced image. Consequently, it is possible to prevent a hardware scale from increasing, and a processing time from being longer.

For example, a case where the number of pixels of an original image is M×N and a reduced image is generated by reducing this original image to $2^{k-1}$ (k=1, 2, 3, . . . ) will be described. In a case of k=3, the number of pixels of a reduced image is (M/4)×(N/4), and therefore one pixel of this reduced image corresponds to 16 pixels of the original image.

Hence, applying spatial filter processing of 3×3 to one pixel of this reduced image is equivalent to applying spatial filter processing to a range of 12×12=144 pixels of the original image. Thus, processing the reduced image is effective from a point of view of a processing load.

However, it is difficult to obtain a high-definition processing result image only by performing image processing on a reduced image whose high frequency component of the original image is lost.

Hence, the image processing apparatus 10 according to each embodiment has been created focusing on the above situation. The image processing apparatus 10 according to each embodiment can suppress a hardware scale and cost compared to a case where image processing is performed only on images having high resolutions, and provide high-definition images compared to a case where image processing is performed only on images having low resolutions. The image processing apparatus 10 according to each embodiment will be described in detail below in order.

2. FIRST EMBODIMENT

Figure 2:
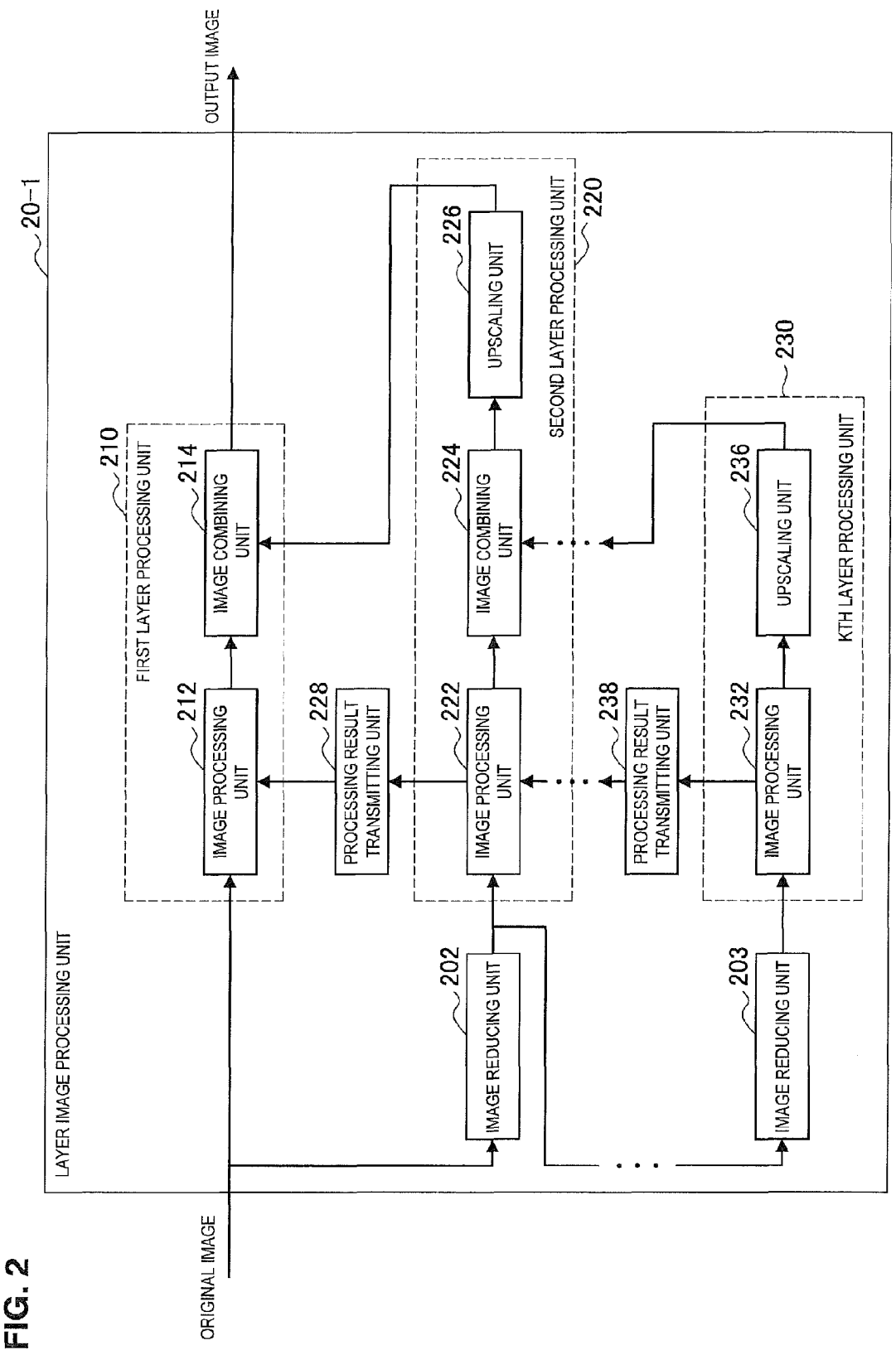
FIG. 2 is a block diagram illustrating a configuration of a layer image processing unit of the image processing apparatus according to a first embodiment.

2-1. Configuration of Image Processing Apparatus according to First Embodiment FIG. 2 is a block diagram illustrating a configuration of a layer image processing unit 20-1 of the image processing apparatus 10 according to the first embodiment. As illustrated in FIG. 2, the layer image processing unit 20-1 has image reducing units 202 and 203, a first layer processing unit 210 to a Kth layer processing unit 230, and processing result transmitting units 228 and 238.

The image reducing unit 202 reduces the number of pixels of an original image to be inputted, and generates a reduced image of a second layer whose number of pixels is the second greatest compared to the original image. Note that, the image reducing unit 202 may reduce the number of pixels of the original image by thinning pixels or may reduce the number of pixels of the original image by averaging a plurality of pixels.

Similarly, the image reducing unit 203 reduces the number of pixels of a reduced image of a K−1th layer to be inputted, and generates a reduced image of the Kth layer whose number of pixels is the smallest. Note that, although not illustrated in FIG. 2, one, or two or more image reducing units may be provided between the image reducing unit 202 and the image reducing unit 203. Note that, each image reducing unit may reduce an image to be inputted, at the same reduction rate. According to this configuration, it is possible to realize each image reducing unit using the same hardware and, consequently, suppress manufacturing cost.

The processing result transmitting unit 228 transmits parameter information obtained by the second layer processing unit 220 to the first layer processing unit 210 of an upper layer which uses the parameter information upon image processing. For example, the parameter information is a histogram which indicates a brightness distribution obtained by global brightness calculation, and gradation conversion may be performed using the histogram in the upper layer.

Similarly, the processing result transmitting unit 238 transmits parameter information obtained by the Kth layer processing unit 230, to the K−1th layer processing unit of an upper layer which uses the parameter information upon image processing. Note that, although not illustrated in FIG. 2, a processing result transmitting unit may be provided between each layer processing unit.

The Kth layer processing unit 230 includes an image processing unit 232 and an upscaling unit 236. The image processing unit 232 performs image processing on the reduced image of the Kth layer inputted from the image reducing unit 203. The upscaling unit 236 upscales (expands) the image of a processing result obtained by the image processing unit 232 to the K−1th layer. Note that, upscaling may mean inserting between pixels a pixel having the same pixel value as that of a neighboring pixel or mean inserting between pixels a pixel having a pixel value of a weight averaging result of surrounding pixels.

The second layer processing unit 220 includes an image processing unit 222, an image combining unit 224 and an upscaling unit 226. The image processing unit 222 performs image processing on a reduced image of the second layer inputted from the image reducing unit 202. The image combining unit 224 combines an image of a processing result obtained by the image processing unit 222 and an image of a processing result in a third layer inputted from a third layer processing unit. Note that, image combining may be weight averaging of each pixel which configures two images.

The first layer processing unit 210 includes an image processing unit 212 and an image combining unit 214. The image processing unit 212 performs image processing on the original image to be inputted. The image combining unit 214 combines an image of a processing result obtained by the image processing unit 212 and an image of a processing result of the third layer inputted from the second layer processing unit 220. Further, the image combining unit 214 outputs an image of the combining result as an output image to the display unit 30 and the memory unit 14.

Note that, although a case where an image processing result of each layer is upscaled per layer has been described with reference to FIG. 2, the present embodiment is not limited to this example. For example, it is also possible to upscale the image processing result of each layer directly to the first layer (the same resolution as that of the original image). Meanwhile, when the image processing result is upscaled per layer as described with reference to FIG. 2, the same upscaling units (226, 236) can be arranged in respective layers, so that it is possible to simplify manufacturing process and suppress manufacturing cost.

As described above, the layer image processing unit 20-1 according to the present embodiment performs image processing on a plurality of layers of different resolutions, and combines the image processing result of each layer. Further, the layer image processing unit 20-1 according to the present embodiment can perform various types of image processing on each layer. A specific example of image processing performed on each layer will be described below.

Note that, although each image processing described below is general processing and therefore will not be described in detail, edge-preserving NR (noise reduction) and NL means NR are examples of brightness NR, chroma NR is processing of correcting chromatic noise, defect correction is processing of correcting defect pixels, gradation conversion is processing of adjusting a relationship between an input and an output, flicker detection is processing of detecting a flicker of a frame, flicker correction is processing of correcting a detected flicker, hand shake correction is processing of correcting an influence of hand shake upon image capturing, global brightness calculation is processing of calculating a brightness distribution, and GMV (Global Motion Vector) detection is processing of detecting a motion vector in frame units.

(Specific Example of Image Processing)

First Processing Example

Figure 3:
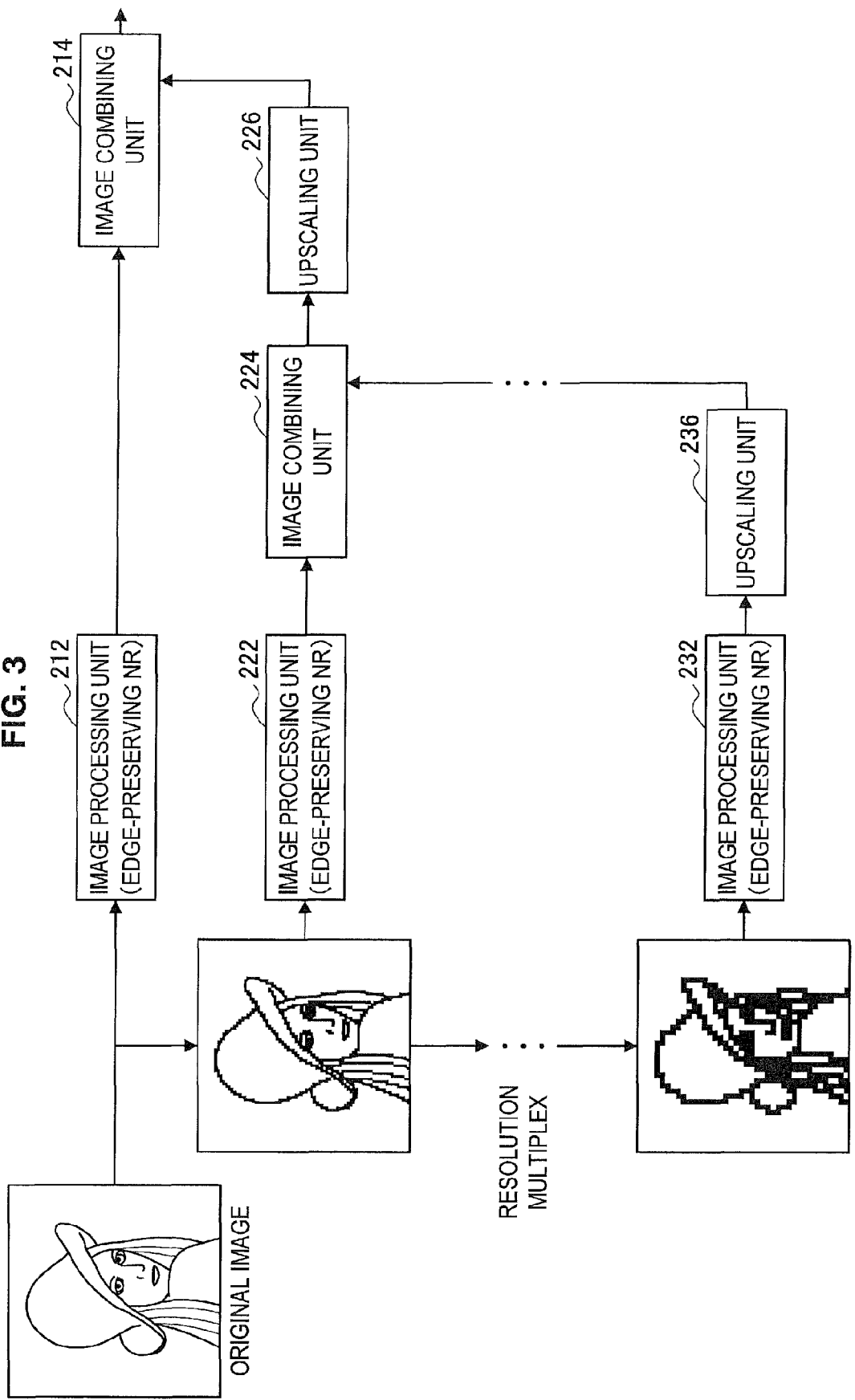
FIG. 3 is an explanatory view illustrating a specific example of image processing in each layer.

The image processing units (212, 222, . . . and 232) in respective layers may perform the same processing as the first processing example. For example, the image processing units (212, 222, . . . and 232) in respective layers may perform the same edge-preserving NR as illustrated in FIG. 3.

Second Processing Example

The image processing units (212, 222, . . . and 232) in respective layers may perform different NR as the second processing example. More specifically, the image processing units (212, 222, . . . and 232) in respective layers may perform NR which is suitable to the resolution of each layer. For example, brightness noise such as roughness on a screen includes a dominant high frequency component, and chromatic noise includes a dominant low frequency component.

Figure 4:
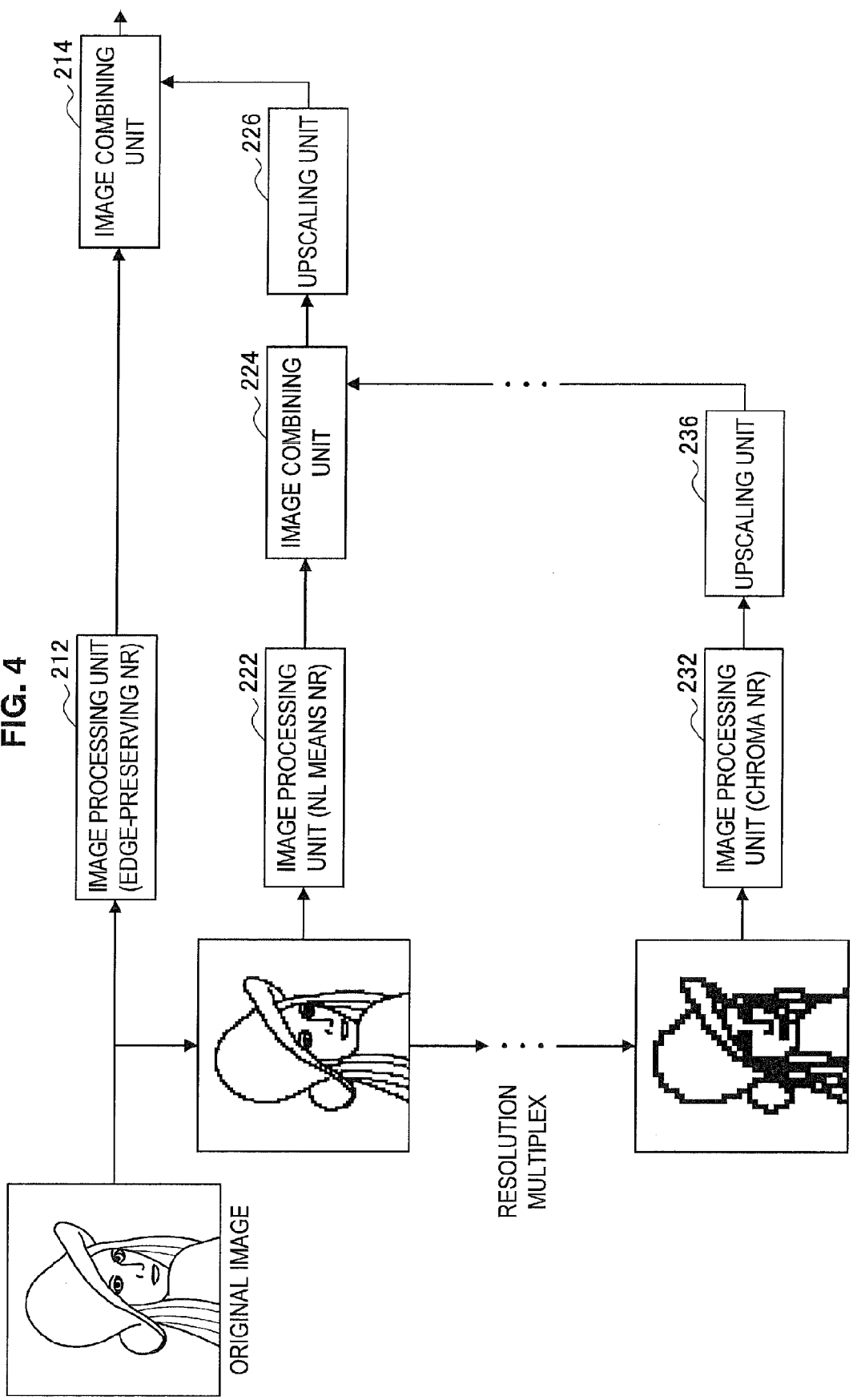
FIG. 4 is an explanatory view illustrating a specific example of image processing in each layer.

Hence, an upper layer side may perform brightness NR such as edge-preserving NR or NL means NR, and a lower layer side may perform chroma NR. That is, as illustrated in FIG. 4, the image processing unit 212 of the first layer may perform the edge-preserving NR, the image processing unit 222 of the second layer may perform NL means NR and the image processing unit 232 of the Kth layer may perform chroma NR. According to this configuration, it is possible to reduce a processing load for performing chroma NR while adequately correcting brightness noise and chromatic noise.

Third Processing Example

The image processing units (212, 222, . . . 232) in respective layers may perform different image processing as a second processing example. More specifically, the image processing units (212, 222, . . . and 232) in respective layers may perform image processing which is suitable to the resolution of each layer. Although, for example, global brightness calculation, flicker detection, GMV detection, chroma NR, gradation conversion, flicker correction and hand shake correction can be executed at a low resolution, adequately executing defect correction is difficult when a resolution is not high.

Figure 5:
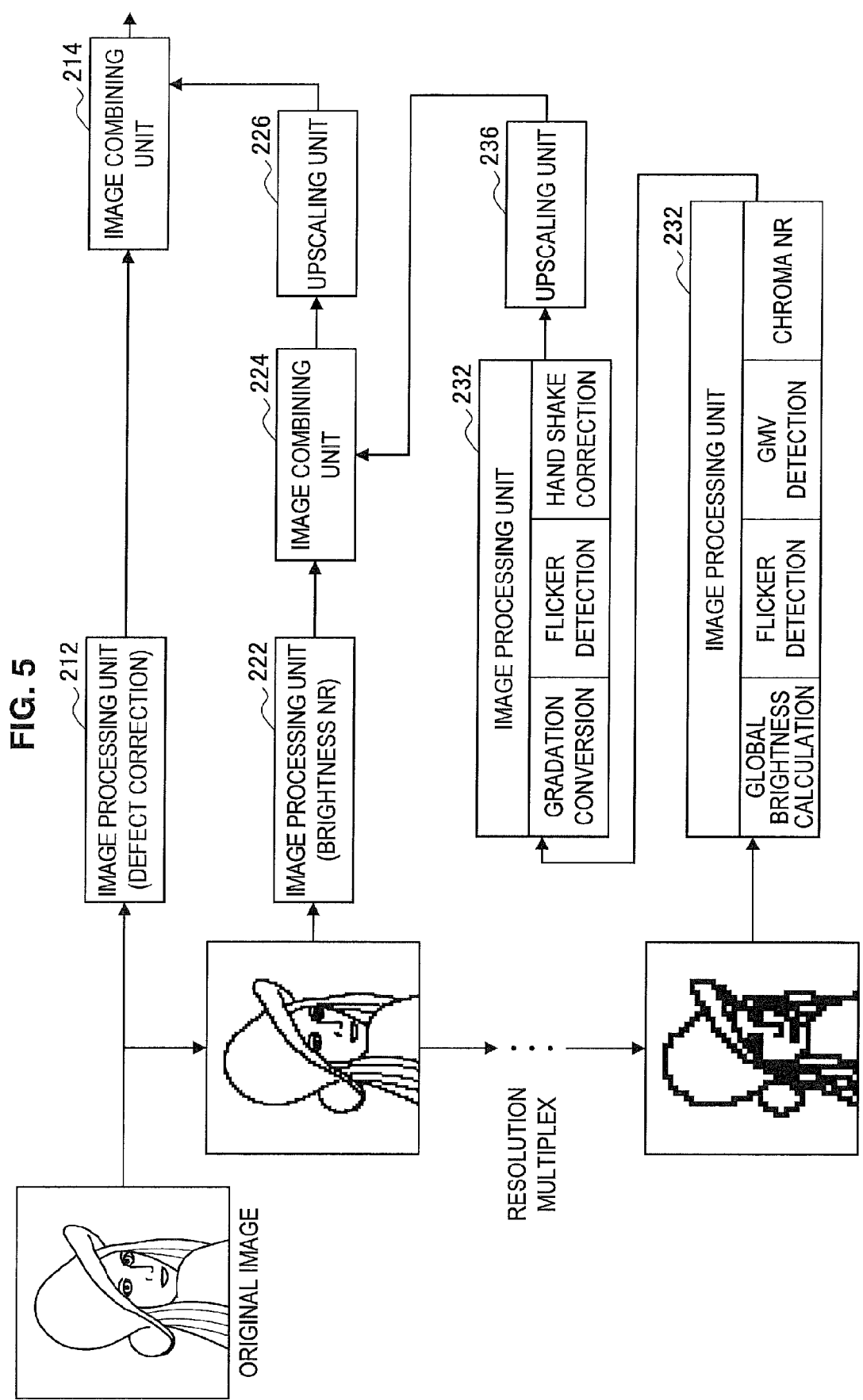
FIG. 5 is an explanatory view illustrating a specific example of image processing in each layer.

Hence, as illustrated in FIG. 5, the image processing unit 212 of the first layer may perform defect correction, the image processing unit 222 of the second layer may perform brightness NR, and the image processing unit 232 of the Kth layer may perform global brightness calculation, flicker detection, GMV detection, chroma NR, gradation conversion, flicker correction and hand shake correction. According to this configuration, it is possible to achieve high image quality of an output image while suppressing an entire processing load.

(Processing Timing in Each Layer)

As described above, the image processing units (212, 222, . . . and 232) in respective layers can perform various patterns of image processing. In this regard, timings at which the image processing units (212, 222, . . . and 232) in respective layers perform image processing are not limited in particular. An example where timings at which the image processing units (212, 222, . . . and 232) in respective layers perform image processing will be described below.

Figure 6:
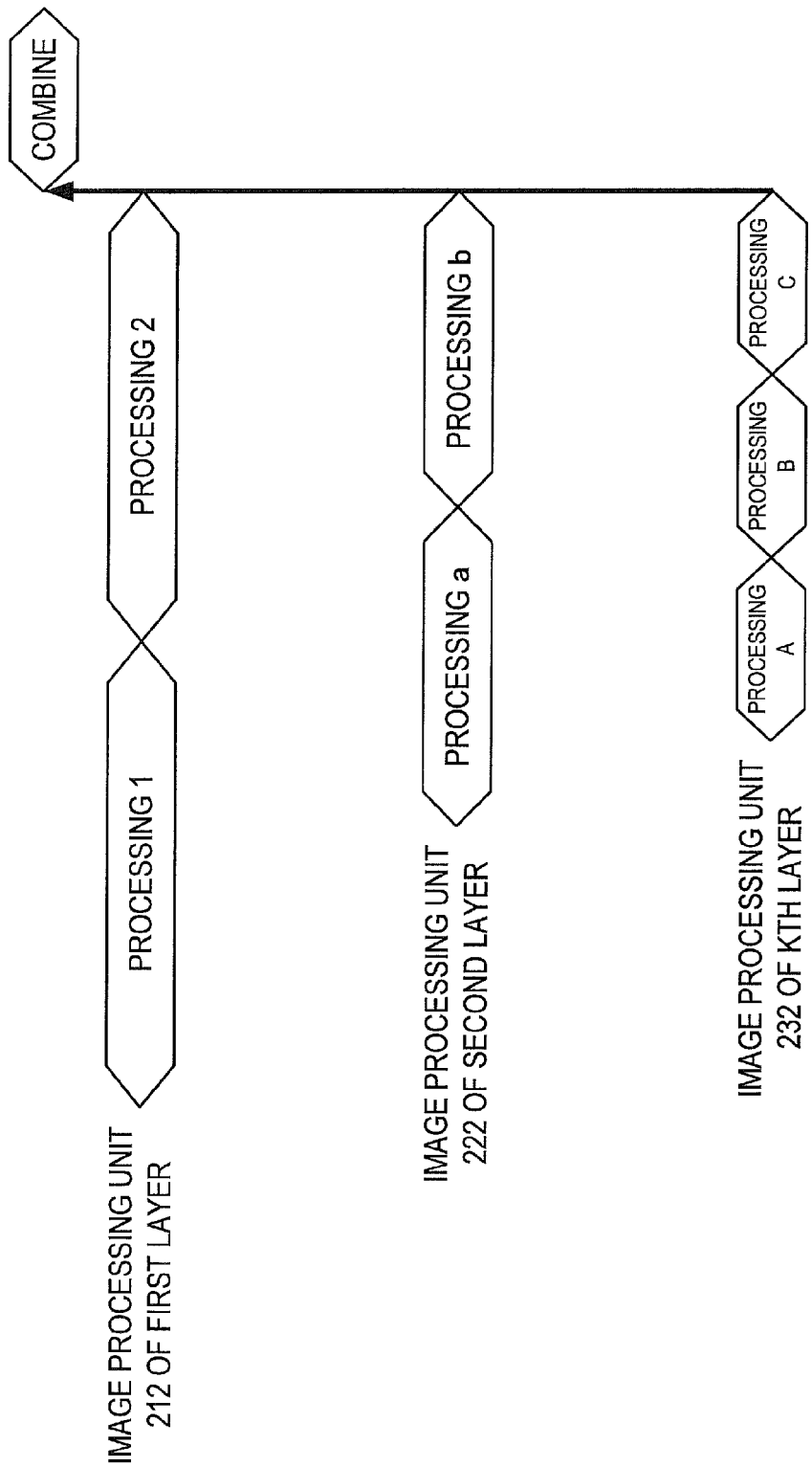
FIG. 6 is an explanatory view illustrating a specific example of a processing timing in each layer.

FIG. 6 is an explanatory view illustrating a first timing example of image processing in each layer. The layer image processing unit 20-1 may start image processing in order from an upper layer as illustrated in FIG. 6. That is, the image processing unit 212 of the first layer may first start image processing (processing 1 and processing 2), the image processing unit 222 of the second layer may next start image processing (processing a and processing b), and the image processing unit 232 of the third layer may subsequently start image processing (processing A, processing B and processing C). Note that, although FIG. 6 illustrates an example where timings at which image processing in each layer ends are coordinated, the image processing in each layer may end at different timings.

Figure 7:
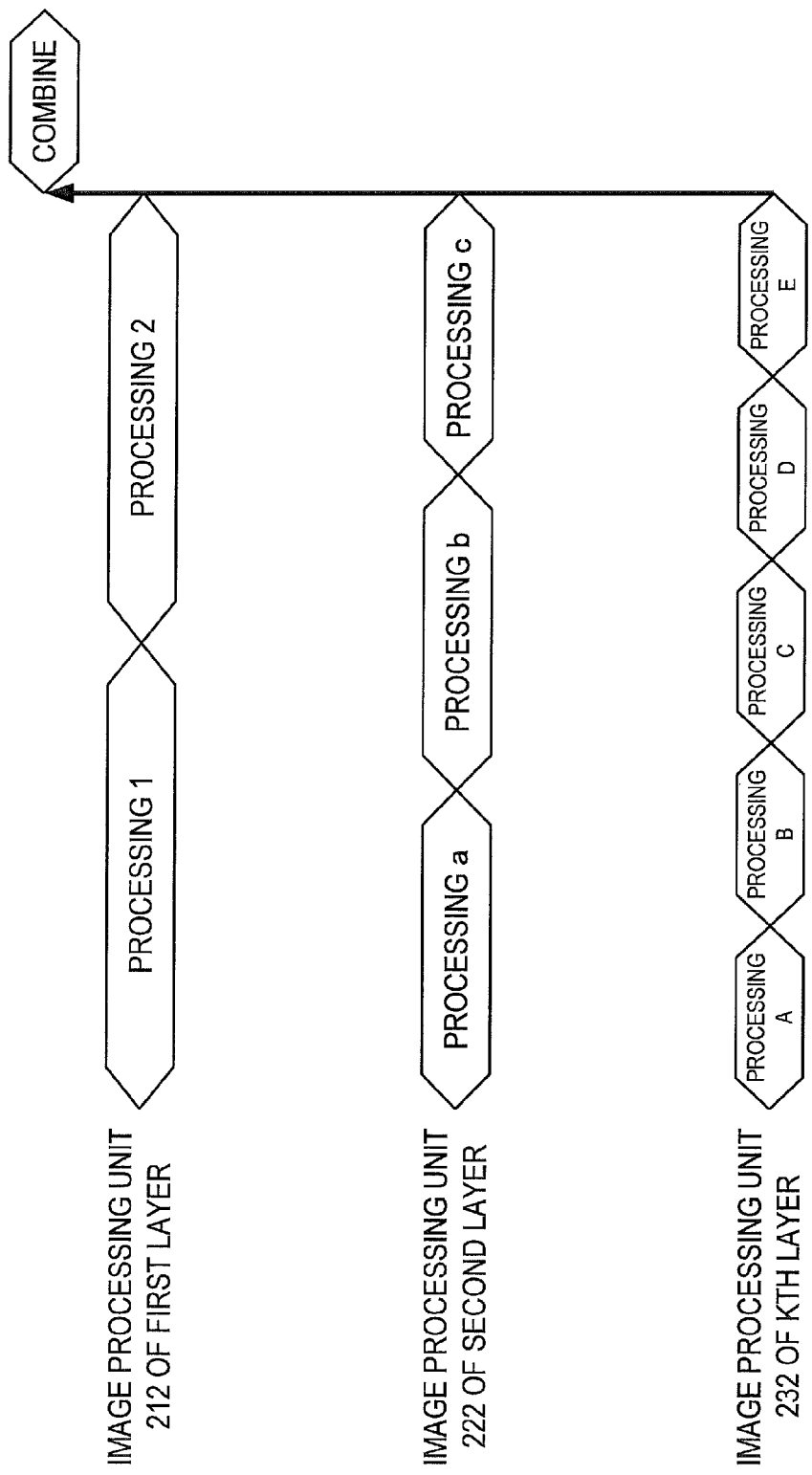
FIG. 7 is an explanatory view illustrating a specific example of a processing timing in each layer.

FIG. 7 is an explanatory view illustrating a second timing example of image processing in each layer. The layer image processing unit 20-1 may start image processing in each layer simultaneously as illustrated in FIG. 7. That is, at the same time when the image processing unit 212 of the first layer may first start image processing (processing 1 and processing 2), the image processing unit 222 of the second layer may next start image processing (processing a, processing b and processing c), and the image processing unit 232 of the third layer may subsequently start image processing (processing A, processing B, processing C, processing D and processing E). Note that, although FIG. 7 illustrates an example where timings at which image processing in each layer ends are coordinated, the image processing in each layer may end at different timings.

Figure 8:
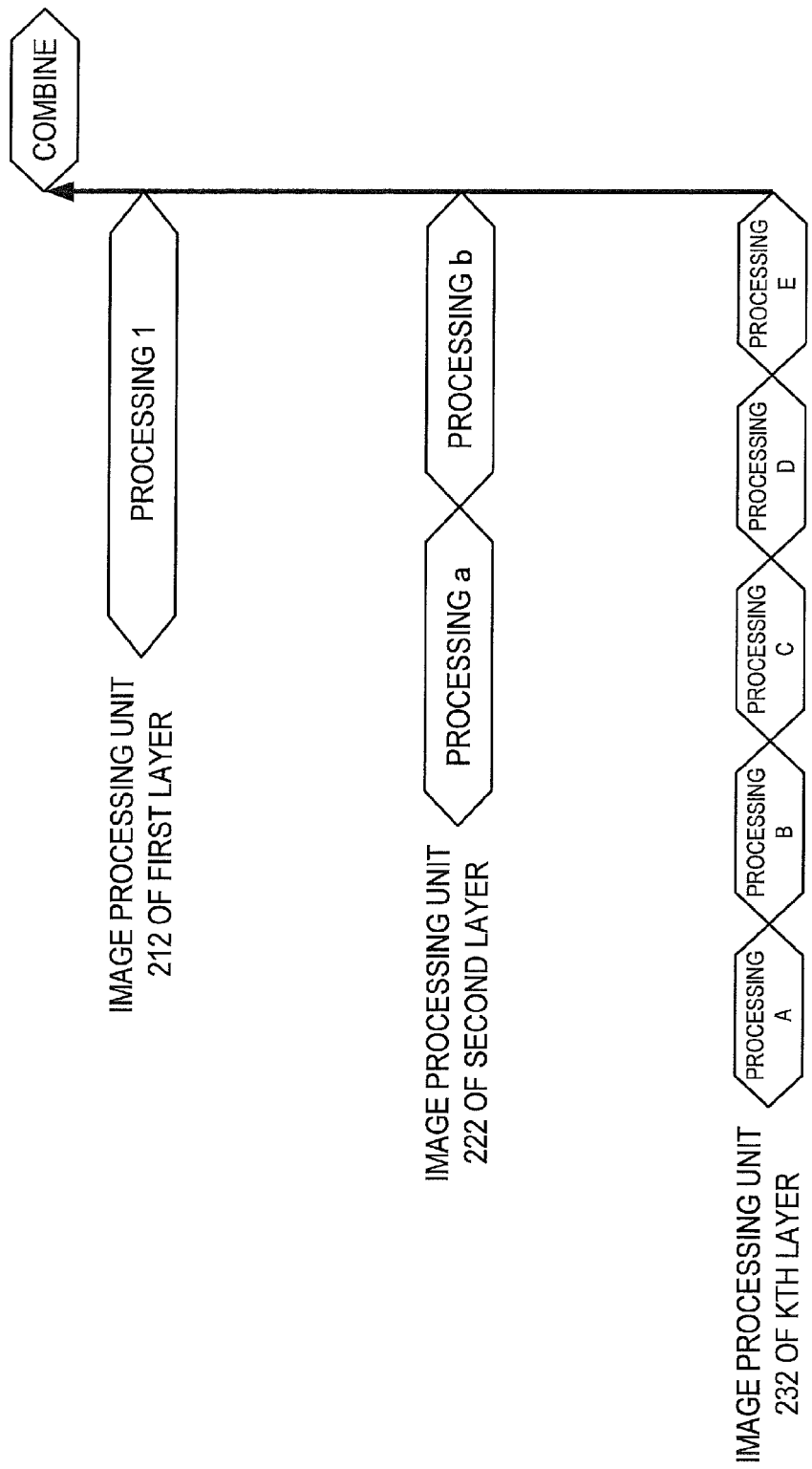
FIG. 8 is an explanatory view illustrating a specific example of a processing timing in each layer.

FIG. 8 is an explanatory view illustrating a third timing example of image processing in each layer. The layer image processing unit 20-1 may start image processing in order from a lower layer as illustrated in FIG. 8. That is, the image processing unit 232 of the third layer may first start image processing (processing A, processing B, processing C, processing D and processing E), the image processing unit 222 of the second layer may next start image processing (processing a and processing b), and the image processing unit 212 of the first layer may subsequently start image processing (processing 1). Note that, although FIG. 8 illustrates an example where timings at which image processing in each layer ends are coordinated, the image processing in each layer may end at different timings.

2-2. Operation of Image Processing Apparatus according to First Embodiment

The configuration of the image processing apparatus 10 according to the first embodiment of the present disclosure has been described above. Next, an operation of the image processing apparatus 10 according to the first embodiment of the present disclosure will be described.

Figure 9:
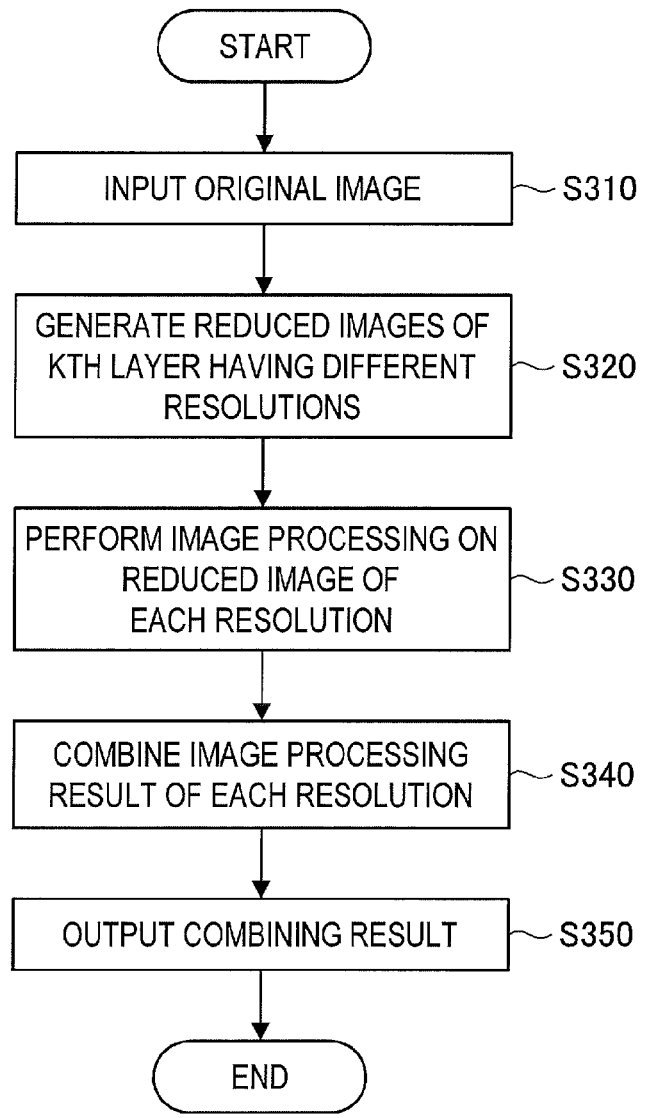
FIG. 9 is a flowchart illustrating an operation of the image processing apparatus according to the first embodiment.

FIG. 9 is a flowchart illustrating the operation of the image processing apparatus 10 according to the first embodiment. As illustrated in FIG. 9, when the layer image processing unit 20-1 first receives an input of an original image (S310), the image reducing units 202 and 203 generate reduced images of different resolutions of the Kth layer (S320).

Further, the image processing unit in each layer performs image processing on the reduced image to be inputted, according to the resolution (S330). Subsequently, the upscaling unit in each layer upscales an image processing result to a resolution of the upper layer, the image combining unit in each layer combines the image processing result of the same layer and the image processing result upscaled in the lower layer (S340), and outputs a combining result (S350). Note that, when the image processing unit in each layer obtains parameter information for image processing in the upper layer, the parameter information is transmitted to the upper layer by the processing result transmitting units (228, . . . and 238).

3. SECOND EMBODIMENT

The first embodiment of the present disclosure has been described above. Subsequently, a second embodiment of the present disclosure will be described. Although an example where a plurality of images of different resolutions is obtained by reducing an original image has been described with the first embodiment, it is possible to obtain a plurality of images of different resolutions at a stage at which an image capturing unit 12 captures images in the second embodiment. Details will be described below.

3-1. Configuration of Image Processing Apparatus according to Second Embodiment

Figure 10:
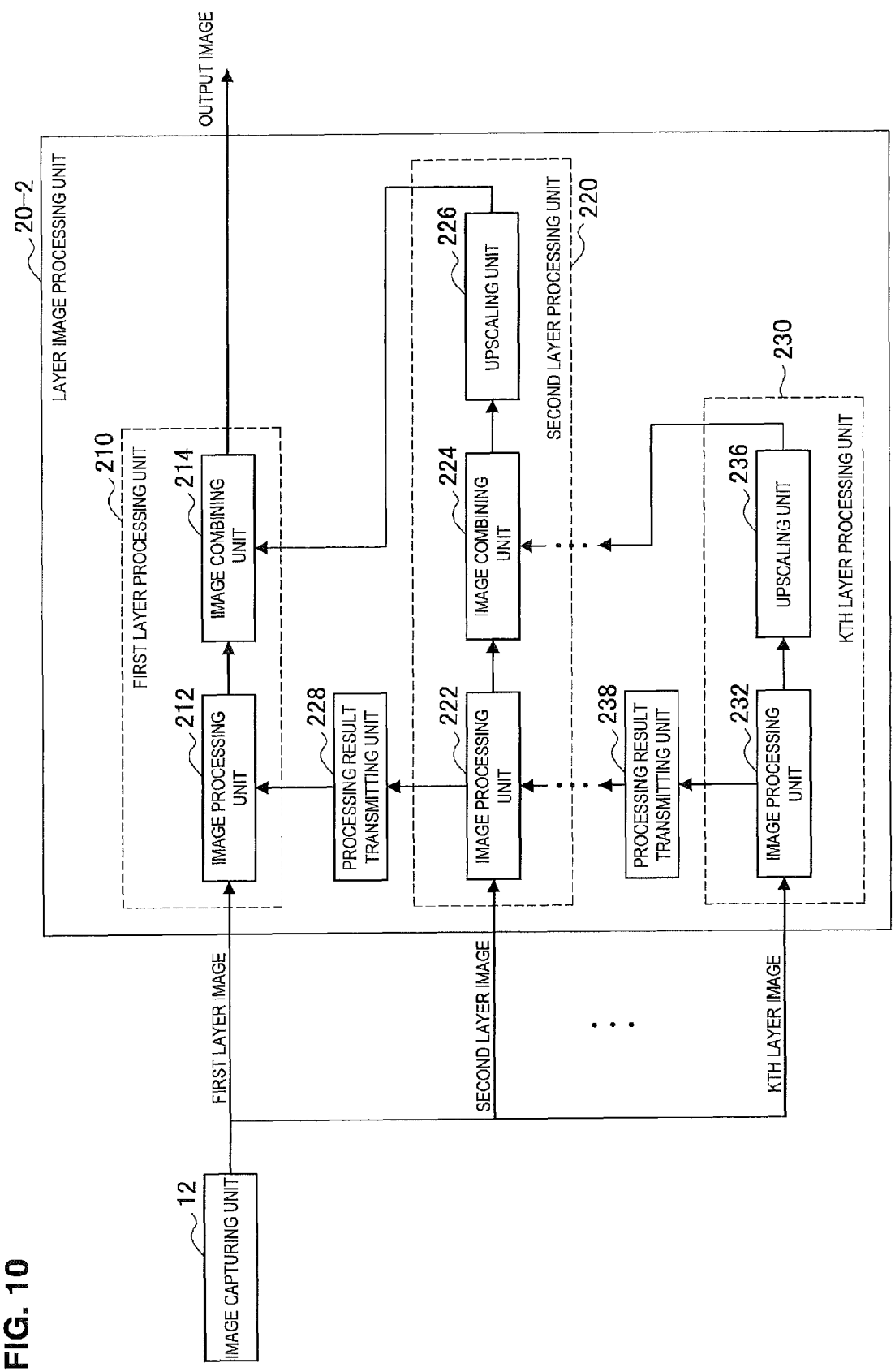
FIG. 10 is a block diagram illustrating a configuration of a layer image processing unit of an image processing apparatus according to a second embodiment.

FIG. 10 is a block diagram illustrating a configuration of a layer image processing unit 20-2 of an image processing apparatus 10 according to the second embodiment. As illustrated in FIG. 10, the layer image processing unit 20-2 has a first layer processing unit 210 to a Kth layer processing unit 230, and processing result transmitting units 228 and 238.

The processing result transmitting units 228 and 238 are arranged between two continuous layers as described in the first embodiment, and parameter information obtained by an image processing unit of a lower layer side is transmitted to the image processing unit of the upper layer side.

The first layer processing unit 210 includes an image processing unit 212 and an image combining unit 214. Although processing contents of the image processing unit 212 and the image combining unit 214 are as described in the first embodiment, a difference from the first embodiment is that an image obtained by the image capturing unit 12 is inputted to the image processing unit 212. More specifically, the image capturing unit 12 obtains a plurality of layer images by capturing images at different exposure timings and different resolutions, and the image processing unit 212 of the first layer receives an input of a first layer image of the highest resolution.

The second layer processing unit 220 includes an image processing unit 222, an image combining unit 224 and an upscaling unit 226. Similar to the first layer, the image processing unit 222 of the second layer receives an input of a second layer image of the second highest resolution.

Further, the Kth layer processing unit 230 includes an image processing unit 232 and an upscaling unit 236. The image processing unit 232 of the Kth layer receives an input of the Kth layer image of the lowest resolution.

(Relationship between Exposure Timing and Processing Timing)

Hereinafter, an exposure timing at which the image capturing unit 12 obtains a plurality of images of different resolutions and a processing timing in each layer will be described with reference to FIGS. 11 and 12.

Figure 11:
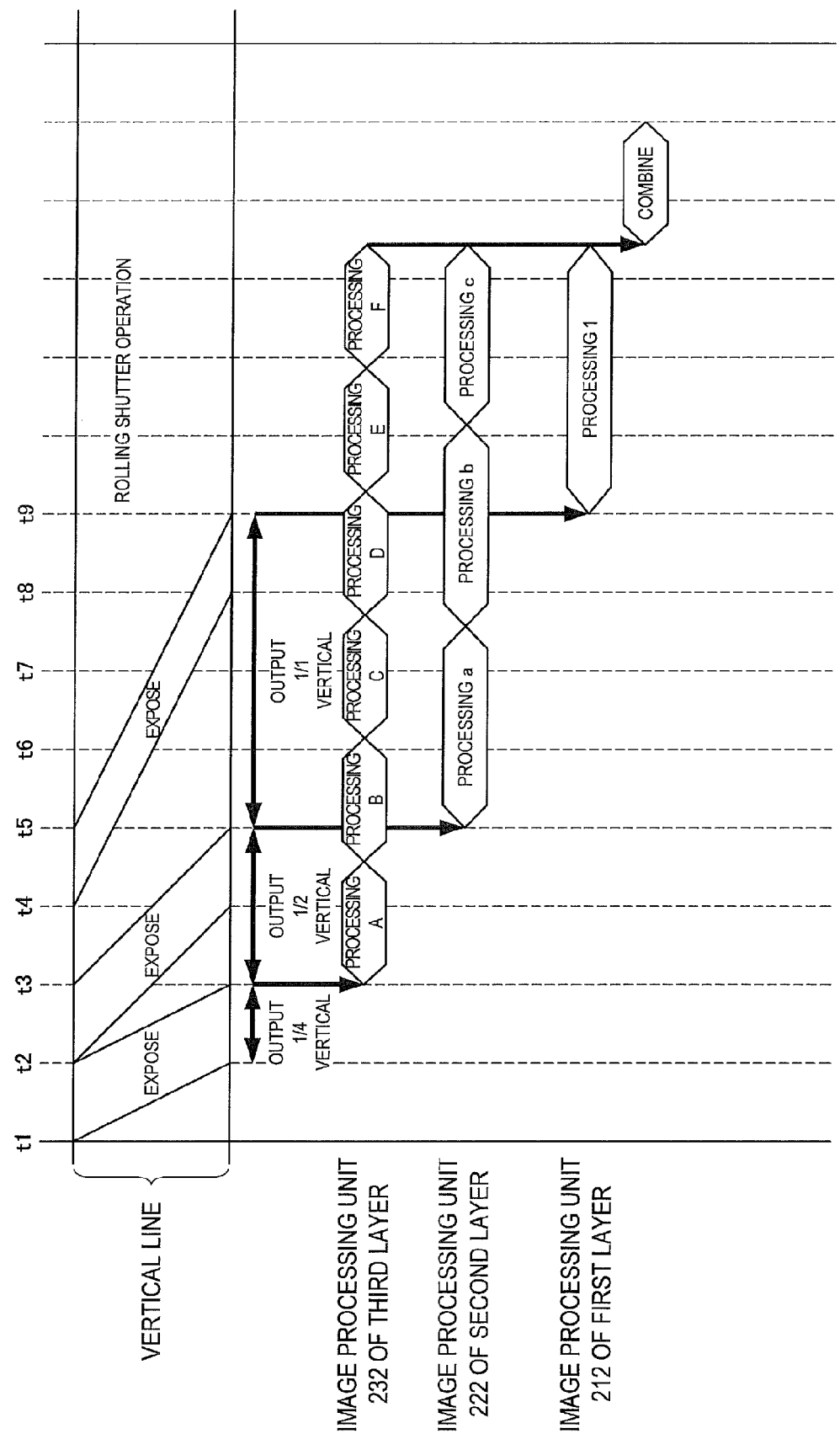
FIG. 11 is an explanatory view illustrating an example of an exposure timing of an image capturing unit and a processing timing in each layer.

FIG. 11 is an explanatory view illustrating an example of the exposure timing of the image capturing unit 12 and the processing timing in each layer. In an example illustrated in FIG. 11, the image capturing unit 12 exposes vertical lines of an image capturing element at t1 to t3 in order, and outputs signals of ¼ vertical lines as a third layer image at t2 to t3. Further, the image processing unit 232 of the third layer starts image processing at t3 at which the third layer image can be obtained.

Furthermore, the image capturing unit 12 exposes vertical lines of the image capturing element at t2 to t5 in order, and outputs signals of ½ vertical lines as a second layer image at t3 to t5. Still further, the image processing unit 222 of the second layer starts image processing at t5 at which the second layer image can be obtained.

Similarly, the image capturing unit 12 exposes the vertical lines of the image capturing element at t4 to t9 in order, and outputs signals of all vertical lines as a first layer image at t5 to t9. Further, the image processing unit 212 of the first layer starts image processing at t9 at which the first layer image can be obtained.

Not that, although FIG. 11 illustrates an example where the image capturing unit 12 performs a rolling shutter operation of exposing vertical lines in order, the image capturing unit 12 may perform a global shutter operation of simultaneously exposing all vertical lines. In this regard, the image capturing unit 12 can achieve the same processing timing as that in FIG. 11 by performing exposure for obtaining the third layer image at t1 to t2, performing exposure for obtaining the second layer image at t2 to t3, and performing exposure for obtaining the first layer image at t4 to t5.

Figure 12:
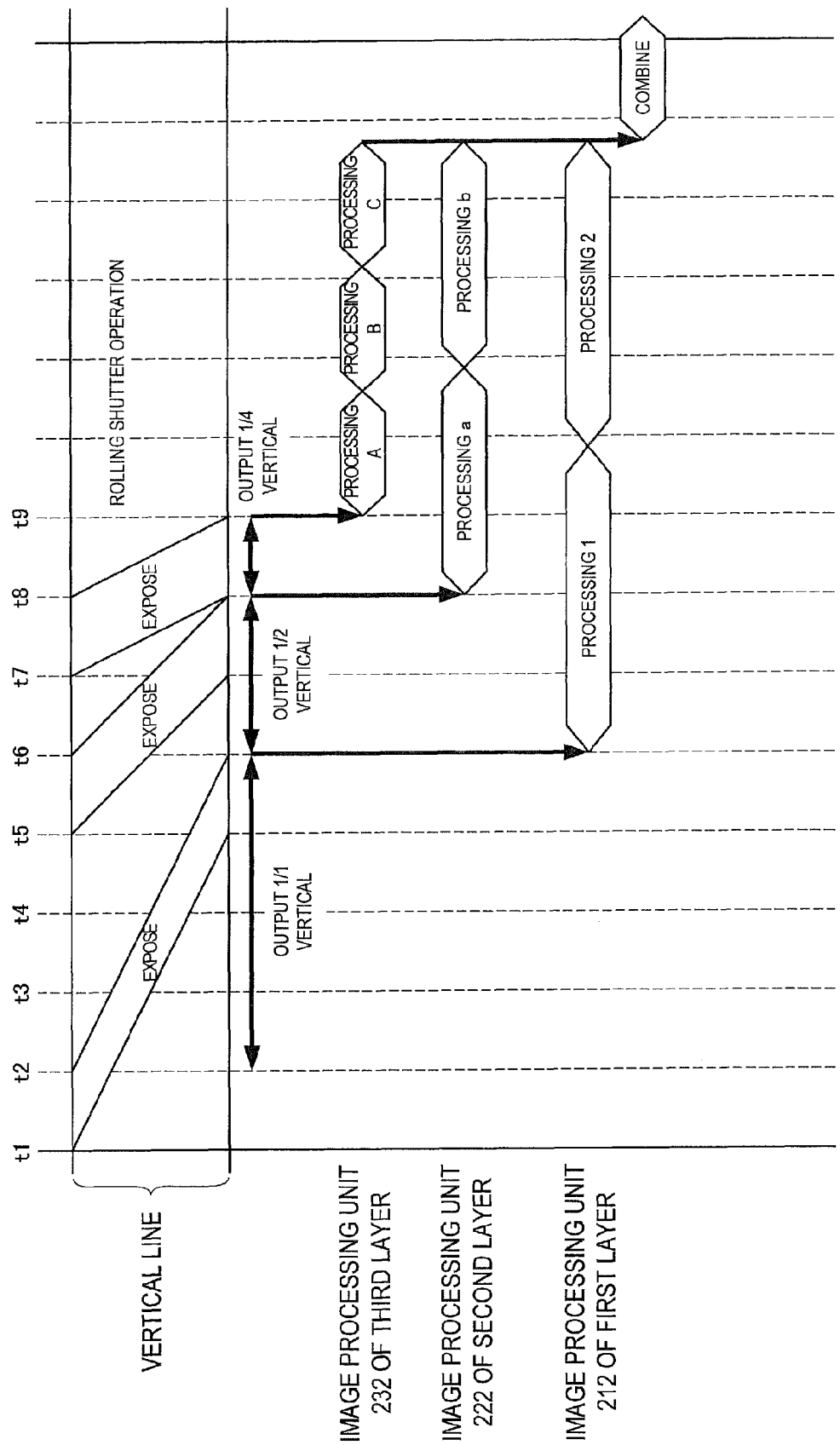
FIG. 12 is an explanatory view illustrating another example of an exposure timing of the image capturing unit and a processing timing in each layer.

FIG. 12 is an explanatory view illustrating another example of an exposure timing of the image capturing unit 12 and a processing timing in each layer. In an example illustrated in FIG. 12, the image capturing unit 12 exposes vertical lines of the image capturing element at t1 to t6 in order, and outputs signals of all vertical lines as the first layer image at t2 to t6. Further, the image processing unit 212 of the first layer starts image processing at t6 at which the first layer image can be obtained.

Furthermore, the image capturing unit 12 exposes vertical lines of the image capturing element at t5 and t8 in order, and outputs signals of ½ vertical lines as the second layer image at t6 and t8. Still further, the image processing unit 222 of the second layer starts image processing at t8 at which the second layer image can be obtained.

Similarly, the image capturing unit 12 exposes vertical lines of the image capturing element at t7 to t9 in order, and outputs signals of ¼ vertical lines as the third layer image at t8 to t9. Further, the image processing unit 232 of the third layer starts image processing at t9 at which the third layer image can be obtained.

Note that, although FIG. 12 illustrates an example where the image capturing unit 12 performs a rolling shutter operation of exposing vertical lines in order, the image capturing unit 12 may perform a global shutter operation of simultaneously exposing all vertical lines. In this regard, the image capturing unit 12 can achieve the same processing timing as that in FIG. 12 by performing exposure for obtaining the first layer image at t1 to t2, performing exposure for obtaining the second layer image at t5 to t6 and performing exposure for obtaining the third layer image at t7 to t8.

3-2. Operation of Image Processing Apparatus According to Second Embodiment

A configuration of the image processing apparatus 10 according to the second embodiment of the present disclosure has been described above. Next, the operation of the image processing apparatus 10 according to the second embodiment of the present disclosure will be described.

FIG. 13 is a flowchart illustrating the operation of the image processing apparatus 10 according to the second embodiment. As illustrated in FIG. 13, first, a plurality of layer images is obtained when the image capturing unit 12 captures images at different exposure timings and different resolutions (S420). The first layer image obtained by the image capturing unit 12 is inputted to the first layer processing unit 210, the second layer image is inputted to the second layer processing unit 220 and the Kth layer image is inputted to the Kth layer processing unit 230.

Further, the image processing unit in each layer performs image processing on a layer image to be inputted according to a resolution (S430). Subsequently, the upscaling unit in each layer upscales an image processing result to a resolution of an upper layer, and the image combining unit in each layer combines the image processing result of the same layer and an image processing result upscaled in the lower layer (S440) and outputs a combining result (S450). Note that, when the image processing unit in each layer obtains parameter information for image processing in an upper layer, the parameter information is transmitted to the upper layer by the processing result transmitting units (228, . . . and 238).

4. CONCLUSION

As described above, according to the embodiments of the present disclosure, image processing is performed on a plurality of layers of different resolutions, and an image processing result of each layer is combined. Consequently, it is possible to suppress a hardware scale and cost compared to a case where image processing is performed only on images having a high resolution, and obtain high-definition images compared to a case where image processing is performed only on images having a low resolution.

Further, according to the first embodiment of the present disclosure, it is possible to obtain a plurality of images of different resolutions by reducing one original image. Furthermore, according to the second embodiment of the present disclosure, the image capturing unit 12 can obtain a plurality of images of different resolutions at a stage at which the image capturing unit 12 captures images.

The preferred embodiments of the present invention have been described above with reference to the accompanying drawings, whilst the present invention is not limited to the above examples, of course. One who has common knowledge in the technical field of the present disclosure may find various alterations and modifications within the scope of the appended claims, and it should be understood that they will naturally come under the technical scope of the present invention.

For example, each step of processing of the image processing apparatus 10 in this description does not necessarily need to be processed in a temporal sequence in order described as the flowchart. For example, each step of processing of the image processing apparatus 10 may be processed in order different from the order described as the flowchart or processed in parallel.

Further, a computer program which causes hardware such as a CPU, a ROM or a RAM built in the image processing apparatus 10 to fulfil a function equivalent to each configuration of the above image processing apparatus 10 can also be created. Furthermore, a memory medium in which the computer program is stored is also provided. Still further, at least part of blocks illustrated as the block diagrams in FIGS. 1, 2 and 10 can be configured by the hardware.

Additionally, the present technology may also be configured as below.

(1)

An image processing apparatus including:

an image processing unit which performs image processing on each of a plurality of images of a same subject having different resolutions; and an image combining unit which combines an image processing result of each of the plurality of images obtained by the image processing unit.

(2)

The image processing apparatus according to (1), wherein the image processing unit performs a same pattern of image processing on each of the plurality of images.

(3)

The image processing apparatus according to (1), wherein the image processing unit performs different patterns of image processing on each of the plurality of images.

(4)

The image processing apparatus according to any one of (1) to (3), further including an upscaling unit which upscales an image processing result of an image of a low resolution side obtained by the image processing unit to be resolution of an image of a high resolution side, wherein the image combining unit combines an image processing result of the image of the high resolution side obtained by the image processing unit and an image processing result of the image of the low resolution side upscaled by the upscaling unit and obtained by the image processing unit.

(5)

The image processing apparatus according to any one of (1) to (4), further including an image converting unit which performs image conversion to obtain the plurality of images having the different resolutions from an input image.

(6)

The image processing apparatus according to any one of (1) to (4), further including an image capturing unit which obtains the plurality of images by capturing images at different exposure timings and at different resolutions.

(7)

The image processing apparatus according to (6), wherein the image processing unit starts performing the image processing on the plurality of images in order of the images captured by the image capturing unit.

(8)

The image processing apparatus according to (6) or (7), wherein the image capturing unit obtains the plurality of images in order of images of a higher resolution side.

(9)

The image processing apparatus according to (6) or (7), wherein the image capturing unit obtains the plurality of images in order of images of a lower resolution side.

(10)

The image processing apparatus according to (3), wherein the image processing unit performs at least brightness noise reduction and chroma noise reduction as image processing, and wherein the image processing unit performs the brightness noise reduction on an image of a higher resolution side than resolution of an image on which the chroma noise reduction is performed.

(11)

The image processing apparatus according to (10), wherein the image processing unit further performs defect correction as image processing, and wherein the image processing unit performs the defect correction on an image of a higher resolution than resolution of the image on which the brightness noise reduction is performed.

(12)

An image processing method including:

performing image processing on each of a plurality of images of a same subject having different resolutions, and combining an image processing result of each of the plurality of images.

REFERENCE SIGNS LIST

10 image processing apparatus
12 image capturing unit
14 memory unit
20 layer image processing unit
30 display unit
202, 203 image reducing unit
210 first layer processing unit
212 image processing unit
214 image combining unit
220 second layer processing unit
222 image processing unit
224 image combining unit
226 up scaling unit
228 processing result transmitting unit 230 kth layer processing unit
232 image processing unit
236 up scaling unit
238 processing result transmitting unit

The invention claimed is:

1. An image processing apparatus comprising:
    an image processing unit which performs image processing on each of a plurality of images of a same subject having different resolutions; and
    an image combining unit which combines an image processing result of each of the plurality of images obtained by the image processing unit,
    wherein the image processing unit performs different patterns of image processing on each of the plurality of images,
    wherein the image processing unit performs at least brightness noise reduction and chroma noise reduction as image processing, and
    wherein the image processing unit performs the brightness noise reduction on an image of a higher resolution than a resolution of an image on which the chroma noise reduction is performed.

2. The image processing apparatus according to claim 1, further comprising
    an image converting unit which performs image conversion to obtain the plurality of images having the different resolutions from an input image.

3. The image processing apparatus according to claim 1, further comprising
    an image capturing unit which obtains the plurality of images by capturing images at different exposure timings and at different resolutions.

4. The image processing apparatus according to claim 3, wherein the image processing unit starts performing the image processing on the plurality of images in order of the images captured by the image capturing unit.

5. The image processing apparatus according to claim 3, wherein the image capturing unit obtains the plurality of images in an order of images of a higher resolution side.

6. The image processing apparatus according to claim 3, wherein the image capturing unit obtains the plurality of images in an order of images of a lower resolution side.

7. The image processing apparatus according to claim 1, wherein the image processing unit further performs defect correction as image processing, and
    wherein the image processing unit performs the defect correction on an image of a higher resolution than the resolution of the image on which the brightness noise reduction is performed.

8. The image processing apparatus according to claim 3, wherein the image processing unit starts performing the image processing on the plurality of images in order of the images captured by the image capturing unit.

9. An image processing apparatus comprising:
    an image processing unit which performs image processing on each of a plurality of images of a same subject having different resolutions;
    an image combining unit which combines an image processing result of each of the plurality of images obtained by the image processing unit; and
    an upscaling unit which upscales an image processing result of an image of a low resolution side obtained by the image processing unit to be a resolution of an image of a high resolution side,
    wherein the image combining unit combines an image processing result of the image of the high resolution side obtained by the image processing unit and an image processing result of the image of the low resolution side upscaled by the upscaling unit and obtained by the image processing unit.

10. The image processing apparatus according to claim 9, wherein the image processing unit performs different patterns of image processing on each of the plurality of images.

11. The image processing apparatus according to claim 9, wherein the image processing unit performs a same pattern of image processing on each of the plurality of images.

12. The image processing apparatus according to claim 9, further comprising
    an image converting unit which performs image conversion to obtain the plurality of images having the different resolutions from an input image.

13. The image processing apparatus according to claim 9, further comprising
    an image capturing unit which obtains the plurality of images by capturing images at different exposure timings and at different resolutions.

14. The image processing apparatus according to claim 13, wherein the image capturing unit obtains the plurality of images in an order of images of a higher resolution side.

15. The image processing apparatus according to claim 13, wherein the image capturing unit obtains the plurality of images in an order of images of a lower resolution side.

* * * * *